Figure 1:
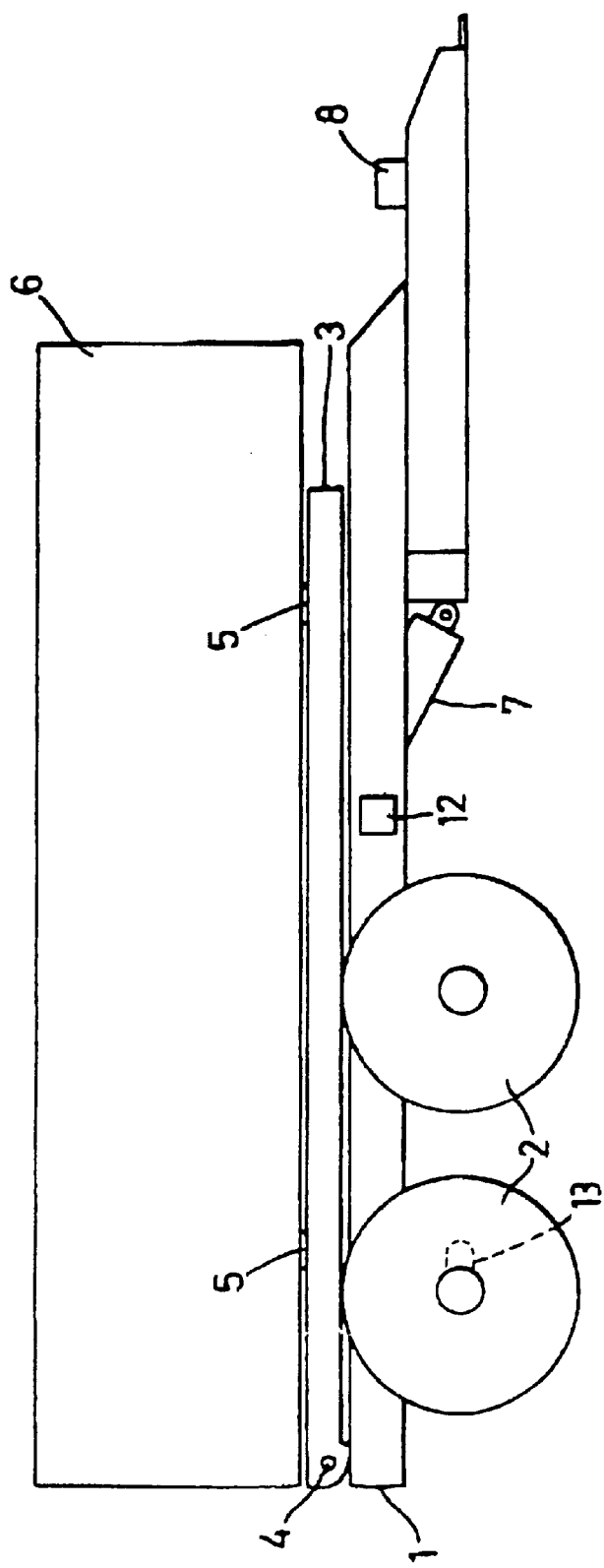

United States Patent
Hart et al.

[11] Patent Number: 6,150,617
[45] Date of Patent: Nov. 21, 2000

[54] VEHICLE WITH WEIGHT SENSING

[75] Inventors: Peter John Hart, Upper Brailes, Nr Banbury; David Forbes Smith, Stockton Rugby; Benjamin Simon Blackmore, Flitton; Richard John Godwin, Silsoe; Paul Nicholas Wheeler, Pirton, Nr Hitchin; Colin Duncan Watt, Clophill, all of United Kingdom

[73] Assignee: AGCO Limited, United Kingdom

[21] Appl. No.: 09/051,336

[22] PCT Filed: Sep. 10, 1996

[86] PCT No.: PCT/GB96/02234

§ 371 Date: Feb. 1, 1999

§ 102(e) Date: Feb. 1, 1999

[87] PCT Pub. No.: WO97/09592

PCT Pub. Date: Mar. 13, 1997

[30] Foreign Application Priority Data

Sep. 9, 1995 [GB] United Kingdom ............... 9518473

[51] Int. Cl.[7] .................... G01G 19/22; G01G 19/08; G01G 19/14; A01D 75/28
[52] U.S. Cl. .................. 177/25.13; 177/136; 701/50; 701/200; 702/174; 460/6; 56/10.2 R
[58] Field of Search ............... 177/25.11, 25.12, 177/25.13, 136; 701/50, 200, 201; 702/174; 460/1, 6; 56/DIG. 2, 10.2 R, 10.2 C, 10.2 J, 16.4 A

[56] References Cited

U.S. PATENT DOCUMENTS

| | | | |
|---|---|---|---|
| 3,669,756 | 6/1972 | Bradley | 177/136 |
| 3,990,032 | 11/1976 | Fish et al. | 177/136 |
| 4,362,097 | 12/1982 | Rodgers | 177/136 |
| 4,393,951 | 7/1983 | Horst-Rudolf | 177/136 |
| 4,694,921 | 9/1987 | Johnson | 177/136 |
| 4,742,880 | 5/1988 | Schrag et al. | 177/136 |
| 5,161,628 | 11/1992 | Wirth | 177/137 |
| 5,282,389 | 2/1994 | Faivre et al. | 73/861.73 |
| 5,384,436 | 1/1995 | Pritchard | 177/136 |
| 5,416,706 | 5/1995 | Hagenbuch | 177/136 |
| 5,644,489 | 7/1997 | Hagenbuch | 177/136 |
| 5,666,793 | 9/1997 | Bottinger | 56/10.2 R |
| 5,717,167 | 2/1998 | Filing et al. | 177/136 |
| 5,754,137 | 5/1998 | Dürrstein | 701/200 |
| 5,809,440 | 9/1998 | Beck et al. | 701/50 |
| 5,870,686 | 2/1999 | Monson | 701/50 |
| 5,902,343 | 5/1999 | Hale et al. | 701/50 |
| 5,959,257 | 9/1999 | Campbell et al. | 177/16 |
| 6,066,809 | 5/2000 | Campbell et al. | 177/16 |

FOREIGN PATENT DOCUMENTS

| | | |
|---|---|---|
| 141756 | 5/1985 | European Pat. Off. . |
| 2043921 | 10/1980 | United Kingdom . |
| 1599315 | 9/1981 | United Kingdom . |
| 2178180 | 2/1987 | United Kingdom . |
| 2256718 | 12/1992 | United Kingdom . |

*Primary Examiner*—Randy W. Gibson
*Attorney, Agent, or Firm*—MacMillan, Sobanski & Todd, LLC

[57] ABSTRACT

An agricultural vehicle is provided with means for continuously sensing the weight of an accumulated payload and a GPS navigation system (18). Weight and positional information, and optionally also sensed vehicle speed, are analysed in an analysis/display unit (14) and a map generated of e.g. weight/hectare. The principal application is an agricultural trailer with payload weight sensors (15), towed by a tractor with GPS and analysis systems. A map of yield of e.g. a root crop may be generated as the crop is harvested and continuously deposited into the trailer as it moves along.

12 Claims, 2 Drawing Sheets

VEHICLE WITH WEIGHT SENSING

The present invention relates to the measurement of crop yield in particular in the context of "yield mapping", that is to say the measurement of crop yield as it varies over a field and the generation of a corresponding map showing the variation. The invention may also have other applications in the general "precision farming" field of technology, that is to say the capturing and using of yield and other data as distributed over an area of land and the automatic varying of treatment of e soil or crops over a given area of land.

It is known to produce a "yield map" using a combine harvester fitted with a grain yield meter together with a locating system. Many types of "yield meter" exist, most of which detect the volume flow of grain passing through a combine harvester. One or two systems detect the mass flow of grain, for example by a gamma ray absorption method or in one proposed system by detecting the weight of the suspended end of an auger carrying harvested grain in a combine harvester; the weight of the suspended end of the auger at any given time is directly representative of the mass flow of grain being transported by the auger. All of these systems tend to be somewhat complex and are also specifically designed for use in combine harvesters. It is an object of the present invention to provide a system for detecting crop yield, and then producing a yield map, which is relatively simple and also applicable to a wide variety of harvesting applications. In particular, it is an object of the invention to provide a system for generating a yield map of a harvested field of root crop.

A further object of the invention is to provide an agricultural trailer with meansfor continuously sensing the weight of its payload whilst moving.

According to the invention, a vehicle comprises payload carrying means characterised by:

a) Sensing means for continuously sensing accumulated payload weight as the vehicle travels along;

b) locating means for establishing the position of the vehicle;

c) analysis means for automatically combining the sensed weight information with the positional information to produce a map of the sensed weight, or a parameter derived therefrom, as distributed across an area over which the vehicle has travelled.

The term "map" as used here is intended to include not only a pictorial representation of a parameter as distributed across an area, but also the equivalent information in electronic form, for example on a computer disk.

It will be appreciated that a map of cumulative sensed weight will, of itself, be little use. However, such information may be processed to produce a map of the change of sensed weight per unit area. When harvesting a root crop, the crop is usually fed directly into a trailer towed behind a tractor as the harvester movesalong a field and thus weight change per unit area amounts to a direct indication of crop yield. However, the only "raw data" which needs to be acquired in the field is an indication of weight and an indication of position. This information may then be processed at leisure, for example using an ordinary office based PC.

It is preferable, however, for the data to receive more treatment "on the go" and accordingly it is preferred that the said derived parameter is the rate of change of accumulated payload with either time or distance, or alternatively is a further parameter derived from that.

It will be appreciated that the rate of change of payload with distance will be directly proportional to the yield (i.e. weight per hectare). The rate of change of payload with time may be combined with the position or speed information to derive weight per hectare, and a further preferable feature is therefore a speed sensing means, the speed being used to generate the derived parameter.

Preferably, the derived parameter is generated using an average value for sensed weight, taken over a given time period, e.g. 1–100 seconds, preferably 5–60 seconds, more preferably 10–40 seconds, or still more preferably 20–30 seconds.

In another aspect of the invention, an agricultural trailer is provided having a payload weight sensing system arranged to generate an electronic output representative of accumulated payload weight or a parameter derived therefromas the trailer travels along.

Such a trailer may be used for a great many applications, but is particularly suitable for use in the context of the first aspect of the invention mentioned above.

Preferably, the trailer has mounted on it a low pass filter for filtering out signals above a given frequency from the payload weight sensing system. This given frequency may be 5 Hz or higher, 10 Hz or higher, or alternatively 15 Hz or higher.

The effect of the low pass filter is to filter out spurious high frequency signals from the weight sensing system, e.g. signals caused by engine vibration from a tractor towing the trailer.

A further problem associated with sensing payload weight whilst on the move is the generation of spurious weight readings as the trailer moves across uneven ground.

This problem may be largely overcome by means on the trailer for averaging the sensed weight over a given time period, and such averaging means may therefore preferably be included in the trailer according to the second aspect of the invention.

Another problem is the effect on the output of the weight sensing system of the inclination of the trailer on sloping ground. and this can be overcome by providing some means for sensing ground slope and adjusting the signal from the weight sensing means accordingly. For example, an electronic inclinometer can be mounted on the trailer and the signal from this fed to a processor for adjusting the sensed weight signal.

Figure 2:
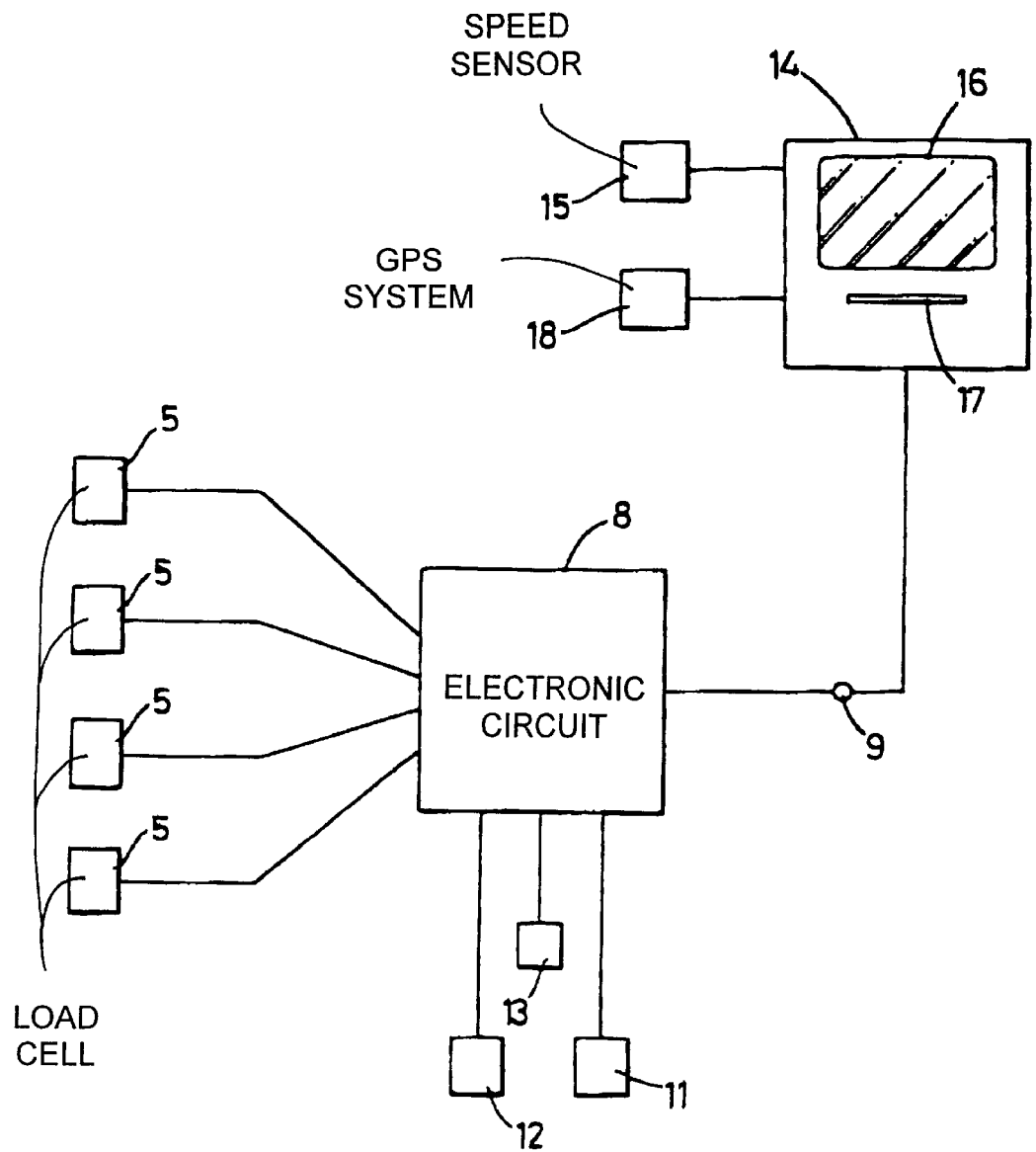

Further features and advantages of the present invention will be apparent from the following description of one specific embodiment which is given by way of example only with reference to the following drawings in which:

FIG. 1 is a side elevation of a trailer in accordance with one aspect of the present invention; and FIG. 2 is a schematic representation of a system for sensing payload weight and producing a map.

Referring firstly to FIG. 1, an agricultural trailer suitable for being towed behind a tractor comprises a main chassis 1, wheels 2 and a subframe 3 pivoted to the main chassis at hinges 4. Mounted on the subframe via load cells 5 is the trailer main body 6 which is essentially an open top box as in any conventional agricultural trailer. Mounted between the main chassis 1 and subframe 3 is a hydraulic cylinder 7 by means of which the subframe is tilted with respect to the chassis. An electronic unit 8 is mounted on the forward part of the trailer and the functioning of this will be explained below. An electronicinclinometer 12 is mounted on the side of the trailer chassis 1 and a speed sensor 13 is mounted on the rear axle of the trailer. An additional load cell (not shown) may optionally be mounted on the trailer with a free hanging weight suspended from it; the purpose and functioning of such a load cell will be explained below.

The trailer differs from a conventional trailer in the inclusion of load cells 5 and also the inclusion of the subframe 3 which would normally be unnecessary, but serves as a mounting point for the load cells 5 so that the cells carry all the weight of the trailer main body 6. Clearly, if the cells were connected between the main chassis 1 and the main body 6, part of the weight of the main body and any payload contained therein would be taken by the hinges 4 and hydraulic cylinder 7. The trailer also differs from a conventional trailer in the inclusion of an inclinometer 12 and speed sensor 13.

There are four load cells located at a distance of about 0.21 of the length of the trailer main body from each end, a front and rear load cell being mounted on each side of the trailer main body. This distribution of load cells has been found to minimise bending effects on the cells. It has also been found that this distribution of load cells is reasonably tolerant to uneven loading in the trailer.

Turning now to FIG. 2, the outputs of the load cells 5, which are analogueelectronic outputs, are connected in parallel (providing a measurement of total load) to electronic circuitry 8, including a microprocessor, arranged to sample the signal to the load cells at 20 hertz.

This frequency was chosen to avoid aliasing effects from undulations in the ground over which the trailer would, in practice, be towed. Given ground undulations of a maximum of 3 hertz, this constituted a sampling rate of over the accepted minimum of a factor of six times the signal frequency The circuitry 8 also includes a low pass filter acting directly on the signal from the load cells 5, before any sampling takes place. This has the effect of removing higher frequency fluctuations produced e.g. by the engine of a tractor to which the trailer is connected. In this embodiment these fluctuations were most apparent at a tractor engine speed of 900 rpm or 15 Hz, but this would of course vary with the type of tractor used.

The electronic circuitry 8 includes means for converting the analogue signals from the load cells into a single digital output, either in parallel or serial form to a port 9. This port 9 provides a connection to a tractor analysis/display system 14 mounted in the cab of a tractor towing the trailer. The tractor system 14 includes a screen 16 and means for transferring data to or from a conventional data carrier, e.g. a computer disk, inserted into a slot 17. The tractor system 14 is connected to a GPS satellite navigation system 18 and includes a microprocessorprogrammed with the necessary software to combine information received from the trailer via port 9 with the positional information from the GPS system 18 to produce a map of weight data. This may be displayed on the screen or outputted to a data carrier.

The trailer electronics 8 include circuitry to average the previous five hundred readings (i.e. a twenty five second period). This has the effect of removing most of any fluctuations in the reading of the load cells due to ground undulation.

The circuitry 8 includes a clock and generates values for rate of change of weight with time at 1 second intervals, using the weight value averaged over the previous 25 seconds. In this way, discrete signals representing the average rate of change of weight over a 25 second period are sent at a rate of 1 Hz to the tractor system 14 for analysis. This has been found to provide sufficient resolution for the purpose of generating yield maps. However, more frequent signals, e.g. at 10, 20 or 50 Hz could be outputted at port 9, alternatively.

It will be appreciated that the output at port 9 could alternatively be simply a continuous reading of cumulative weight (preferably a running average over a few seconds, e.g. 25 seconds) and any processing to convert this into information directly representative of yield could be performed in the tractor system 14. Even the averaging stage could be performed in the tractor. In

What is claimed is:

1. An agricultural tractor that is operable in an agricultural field comprising:

a chassis supported on a plurality of wheels;

a payload supported on said chassis and adapted to receive products therein as the tractor is moved throughout the agricultural field;

a weight sensor for generating a signal that is representative of the weight of the products in said payload;

a position sensor for generating a signal that is representative of the position of the tractor in the agricultural field; and a controller that is responsive to said signals from said weight sensor and said position sensor for generating a map of the weight of the products in said payload as a function of the position of the tractor in the agricultural field.

2. The agricultural tractor defined in claim 1 wherein said weight sensor includes a load cell.

3. The agricultural tractor defined in claim 1 wherein said weight sensor includes a plurality of load cells provided between said chassis and said payload.

4. The agricultural tractor defined in claim 1 wherein said position sensor includes a global positioning satellite navigation system.

5. The agricultural tractor defined in claim 1 wherein said controller is an electronic controller.

6. The agricultural tractor defined in claim 1 wherein said controller is responsive to said signals from said weight sensor and said position sensor over a period of time for generating a map of the averaged weight of the products in said payload as a function of the position of said agricultural tractor in the agricultural field.

7. The agricultural tractor defined in claim 1 wherein said controller is responsive to said signals from said weight sensor and said position sensor over a period of time for generating a map of the average rate of change of weight of the products in said payload as a function of the position of said agricultural tractor in the agricultural field.

8. The agricultural tractor defined in claim 1 further including a speed sensor for generating a signal that is representative of the speed of said agricultural tractor, and wherein said controller is responsive to said signals from said weight sensor, said position sensor, and said speed sensor for generating a map of the weight of the products in said payload as a function of the position of said agricultural tractor in the agricultural field.

9. The agricultural tractor defined in claim 1 further including means for adjusting the value of said signal from said weight sensor in response to the inclination of said agricultural tractor.

10. The agricultural tractor defined in claim 1 further including an inclinometer for generating a signal that is representative of the angle of said agricultural tractor, and wherein said controller is responsive to said signals from said weight sensor, said position sensor, and said inclinometer for generating a map of the weight of the products in said payload as a function of the position of said agricultural tractor in the agricultural field.

11. The agricultural tractor defined in claim 1 further including an inclinometer for generating a signal that is representative of the angle of said agricultural tractor, and wherein said controller is responsive to said signals from said weight sensor, said position sensor, and said inclinometer for generating a map of the weight of the products in said payload as a function of the position of said agricultural tractor in the agricultural field.

12. The agricultural tractor defined in claim 1 further including a supplemental weight supported on said chassis and a supplemental weight sensor for generating a signal that is representative of said supplemental weight, and wherein said controller is responsive to said signals from said weight sensor, said position sensor, and said supplemental weight sensor for generating a map of the weight of the products in said payload as a function of the position of said agricultural tractor in the agricultural field.

* * * * *